United States Patent [19]
Katamachi et al.

[11] Patent Number: 5,896,851
[45] Date of Patent: Apr. 27, 1999

[54] WIRE SAW

[75] Inventors: Shozo Katamachi; Shigeru Okubo, both of Mitaka, Japan

[73] Assignee: Tokyo Seimitsu Co., Ltd., Tokyo, Japan

[21] Appl. No.: 08/633,645

[22] Filed: Apr. 17, 1996

[30] Foreign Application Priority Data

Apr. 21, 1995 [JP] Japan .................. 7-097008
May 15, 1995 [JP] Japan .................. 7-115764

[51] Int. Cl.$^6$ .................................................. B28D 1/08
[52] U.S. Cl. .................................. 125/16.02; 125/21
[58] Field of Search .......................... 125/16.02, 21, 125/23.01, 16.01; 451/168

[56] References Cited

U.S. PATENT DOCUMENTS

| | | |
|---|---|---|
| 3,841,297 | 10/1974 | Mech. |
| 5,099,820 | 3/1992 | Stricot ............................. 125/16.02 |
| 5,201,305 | 4/1993 | Takeuchi ........................... 125/21 |

FOREIGN PATENT DOCUMENTS

| | | | |
|---|---|---|---|
| 0 088 902 | 9/1983 | European Pat. Off. | |
| 885669 | 9/1943 | France ........................ | 451/168 |
| 61-182759 | 8/1986 | Japan. | |
| 5220732 | 8/1993 | Japan ......................... | 125/21 |
| 771622 | 4/1957 | United Kingdom .............. | 125/21 |

*Primary Examiner*—Robert A. Rose
*Attorney, Agent, or Firm*—Sixbey, Friedman, Leedom & Ferguson; David S. Safran

[57] ABSTRACT

A turn table is connected to a rotary shaft of a driving motor for driving a wire reel coaxially therewith. The wire reel is connected onto this turn table. With this arrangement, the wire reel is directly driven by the driving motor. Accordingly, the period of time needed for acceleration or deceleration for the driving motor can be shortened, so that through-put can be improved. Furthermore, for the driving motor, a motor being low in inertia, i.e., a small-sized motor can be used, so that a driving section can be made compact in size. Further, a space for a belt transmission mechanism, which has heretofore been necessary, can be saved, so that the driving section can be made compact in size.

4 Claims, 2 Drawing Sheets

WIRE SAW

BACKGROUND OF THE INVENTION

1. Field of the Invention

This invention relates to a wire saw, and more particularly to a wire saw for cutting work such as a columnar semiconductor ingot, ceramics and glass into a multitude of wafers by wire rows.

2. Description of the Related Art

One of cutting devices for cutting a work such as a semiconductor ingot, ceramics and glass into thin sheet-shaped wafers is a wire saw. This wire saw is a device used in such a manner that a work is abutted against a wire running between a pair of wire reels while working solution containing abrasive grains is supplied to the wire, whereby the work is cut into wafers through the lapping action of the abrasive grains.

In recent years, the diameters of the wafers have the tendency to increase in size for example from 8 inches to 12 inches. For this reason, the wire used for cutting, longer ones is being used. For this reason, the weight of the wire reels, around which the wire is wound should necessarily have the tendency to increase in weight exceeding 100 kg.

Heretofore, the wire reels of the wire saw have been driven in a manner to transmit the rotation of a driving motors by the belt transmission.

Furthermore, as the cutting methods by use of the wire saw, there are two methods including one-way feeding cutting, in which the work is cut while the wire is caused to run only in one way, and a double-way feeding cutting, in which the work is cut while the wire is caused to run reciprocatingly. From these methods, in the case of the double-way feeding cutting, the wire reel should necessarily repeat acceleration and deceleration in a short period of time (1 to 6 sec.), so that a high acceleration torque becomes necessary due to the inertia of the wire reel.

However, if the wire reel having a large weight is driven by the driving method of the conventional belt transmission, then a motor having a high inertia should be necessary for driving the wire reel, so that a large-sized motor should be used for driving the wire reel, thus causing a problem in that a driving section becomes large-sized. Furthermore, when the acceleration or deceleration torque is high, it is deemed that the damages of the belt and the like are caused, thus raising such a problem that the period of time for the acceleration or deceleration cannot be shortened and so forth.

SUMMARY OF THE INVENTION

The present invention has been developed in view of the disadvantages of the prior art described hereinabove, with the result that a driving motor having low inertia can be used, so that a main body of a wire saw device can be made compact in size and the period of time needed for acceleration or deceleration can be shortened. Therefore, the present invention has as its object the provision of a wire saw capable of improving through-put.

To achieve the above-described object, the present invention is characterized in that, in a wire saw, in which a wire is drawn out of one of wire reels, guided around a plurality of grooved rollers to form wire rows and wound up by the other of the wire reels, while a work is abutted against the wire rows with working solution containing abrasive grains being supplied to the wire rows, whereby the work is cut into a multitude of thin sheet-shaped wafers, one of the wire reels is connected to a rotary shaft of a driving motor for driving one of the wire reels coaxially with the rotary shaft.

Furthermore, to achieve the above-described object, the present invention is characterized in that, in a wire saw, in which a wire is drawn out of one of the wire reels, guided around a plurality of grooved rollers to form wire rows and wound up by the other of the wire reels, while a work is abutted against the wire rows with working solution containing abrasive grains being supplied to the wire rows, whereby the work is cut into a multitude of thin sheet-shaped wafers, the grooved roller is connected to a rotary shaft of a driving motor for driving the grooved roller coaxially with the rotary shaft.

According to the present invention, the wire reels and the grooved roller are directly connected to the driving motors and driven directly by the driving motors. With this arrangement, the period of time needed for acceleration or deceleration is shortened, so that the through-put is improved. Furthermore, for the driving motors, motors being low in inertia, i.e., small-sized motors can be used, so that the driving sections can be made compact in size. Further, a space for the belt transmission mechanism, which has heretofore been necessary, can be saved, so that the driving section can be made compact in size.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
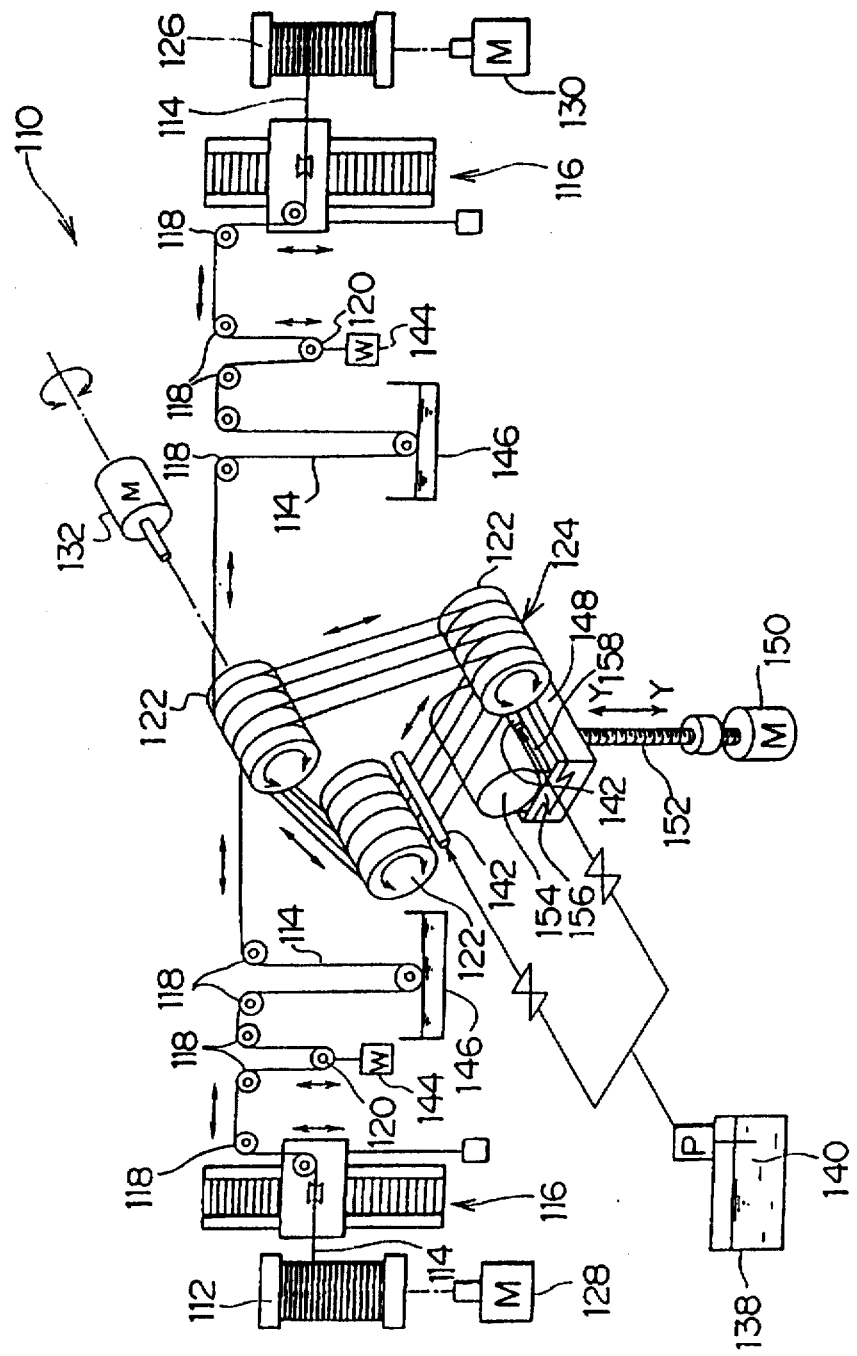
FIG. 1 is a general diagram of the wire saw.

FIG. 1 is the general diagram showing a wire saw 110. A wire 114 wound around one 112 of wire reels passes through a wire guiding device 116, a plurality of fixed guide rollers 118 and 118, and a dancer roller 120, is successively guided around three grooved rollers 122, 122 and 122 to form wire rows 124. Then, the wire 114 pass through a plurality of another fixed guide rollers 118, 118, an another dancer roller 120 and an another wire guiding device 116, and are wound up by the other 126 of the wire reels.

Each of weights 144 having a predetermined weight is hung down from each of the dancer rollers 120, whereby tensile force of a predetermined value is constantly given to the running wire 114.

Wire washing devices 146 are provided on the half-ways of the wire running, whereby working solution 140 adhering to the wire 114 is removed by these wire washing devices 146.

The wire reels 112 and 126 are connected to driving motors 128 and 130 which are capable of being rotated in the forward and reverse directions, and one 122 of the three grooved rollers is connected to a driving motor 132 capable of being rotated in the forward and reverse directions. With this arrangement, the wire 114 runs reciprocatingly between one 112 of the wire reels and the other 126 of the wire reels.

The working solution 140 containing abrasive grains (normally used in the order of GC#600–#1000), which is stored in the working solution storage tank 138, is supplied to the wire rows 124 through the working solution supplying nozzle 142.

A downward of the wire rows 124, a semiconductor ingot 154 as being a work is supported by a work feeding table 148 through a work block 156 and a slice base 158. This work feeding table 148 is made vertically movable by a ball screw 152 being rotated by a motor 150. The work feeding table 148 is moved upwardly, whereby the semiconductor ingot 154 is abutted against the wire rows 124 running at high speed, and cut into a multitude of wafers through the lapping action of the working solution 140 supplied to the wire rows 124.

Figure 2:
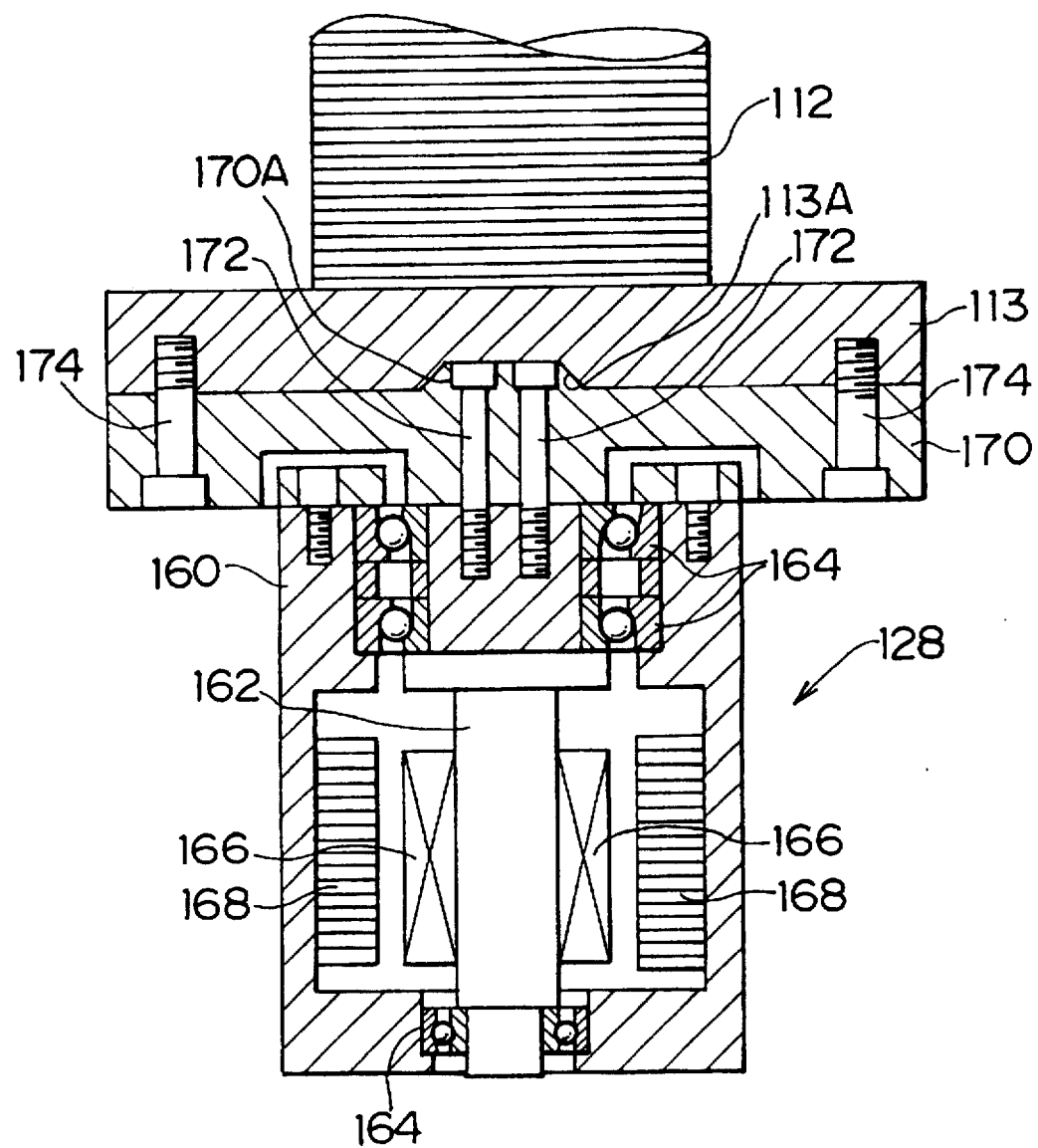
FIG. 2 is a sectional view showing the driving portion of the wire reel.

FIG. 2 is the sectional view showing the construction of the driving portion of the wire reel 112.

In a casing 160 fixed to a frame of a main body of the wire saw, not shown, a rotary shaft 62 is rotatably supported through bearings 164, 164 and 164. Permanent magnets 166 and 166 are secured to the circumferential surface of this rotary shaft 162.

On the other hand, on the inner peripheral wall of the casing 160, armature coils 168 and 168 are opposed to the permanent magnets 166 and 166 and secured to the casing 160. Electric current is passed through these armature coils 168 and 168 to rotate the rotary shaft 162.

A turntable 170 formed to provide a disc is connected to the top end portion of the rotary shaft 162. This turn table 170 is connected to the rotary shaft 162 coaxiably therewith, and a connected portion thereof is bolted through two joining bolts 172 and 172. The wire reel 112 is connected to the top surface of this turntable 170.

A truncated cone-shaped recessed portion 113A is formed at the center of the undersurface of a flange 113 of the wire reel 112. On the other hand, a truncated cone-shaped projected portion 170A is opposed to the truncated cone-shaped recessed portion 113A and formed at the center of the top surface of the turntable 170. At the time of connection, this recessed portion 113A and the projected portion 170A are coupled to each other, whereby the wire reel 112 and the turntable 170 can be coaxially connected to each other. The wire reel 112 and the turntable 170, which are connected to each other, are fixed to each other by being bolted through bolts 174 and 174 at the circumferential end portions thereof. With this arrangement, the rotation of the turntable 170 can be imparted to the wire reel 112 without slipping.

The rotatable driving section of the turntable 170 is turned into a built-in type as described above, whereby the wire reel 112 is directly connected to the driving motor 128 to be directly driven. With this arrangement, the period of time needed for acceleration or deceleration is shortened, so that the through-put can be improved.

Furthermore, for the driving motor, the motor being low in inertia, i.e., the small-sized motor can be used, so that the driving section can be made compact in size.

Further, the space for the belt transmission mechanism, which has heretofore been necessary, can be saved, so that the driving section can be made compact in size. Furthermore, with this arrangement, the danger of belt damages during operation can be eliminated.

The another wire reel 126 is performed by the driving motor 130 connected thereto similarly to the case of the wire reel 112.

Incidentally, the driving of the grooved roller 122 forming the wire rows 124 is performed by the driving motor connected thereto similarly to the case of the wire reels 112, 116 so that the advantages similar to the case of the wire reels 112, 116 can be achieved.

As has been described hereinabove, in the wire saw according to the present invention, the wire reels and the grooved roller are directly connected to the driving motors to be directly driven by the respective driving motors. With this arrangement, the period of time needed for the acceleration or deceleration can be shortened, so that the through-put can be improved. Furthermore, for the driving motors, the motors being low in inertia, i.e., the small-sized motors can be used, so that the driving sections can be made compact in size. Further, the space for the belt transmission mechanism, which has heretofore been necessary, can be saved, so that the driving sections can be made compact in size.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A wire saw having a first wire reel and a second wire reel, at least one of which is connected to a motor, and a wire which is drawn out, guided around a plurality of grooved rollers to form wire rows and wound up by the second wire reel while a work is abutted against said wire rows with working solution containing abrasive grains being supplied to said wire rows, whereby said work is cut into a multitude of thin sheet-shaped wafers, said wire saw comprising:

a rotary shaft rotatably supported on a casing of said motor;

a turntable with a positioning projection at a center thereof connected to said rotary shaft; and a flange on at least one of said first and second wire reels, said flange having a concave portion at a center thereof and being connected to said turntable with the concave portion of the flange engaging the projection of said turntable.

2. The wire saw as defined in claim 1, wherein said projection is a truncated cone.

3. The wire saw as defined in claim 2, wherein said wire reels and said motor are arranged vertically.

4. A wire saw having a first wire reel and a second wire reel, at least one of which is connected to a motor, and a wire is drawn out, guided around a plurality of grooved rollers to form wire rows and wound up by the second wire reel while a work is abutted against said wire rows with working solution containing abrasive grains being supplied to said wire rows, whereby said work is cut into a multitude of thin sheet-shaped wafers, said wire saw comprising:

a rotary shaft rotatably support on a casing of said motor;

a permanent magnet secured to said rotary shaft;

armature coils provided on an inner peripheral wall of said casing, an electric current being carried through said armature coils to rotate said rotary shaft;

a turntable connected to said rotary shaft; and a flange on at least one of said first and second wire reels, said flange having a concave portion at a center thereof and being connected to said turntable with the concave portion of the flange engaging a projection of said turntable.

* * * * *